United States Patent
Sano

(10) Patent No.: US 8,491,771 B2
(45) Date of Patent: Jul. 23, 2013

(54) ELECTROLYZER CELL FOR PRODUCING ACIDIC OR ALKALINE ELECTROLYZED WATER

(75) Inventor: Yoichi Sano, Kanagawa-ken (JP)

(73) Assignee: Ecolab USA Inc., St. Paul, MN (US)

( * ) Notice: Subject to any disclaimer, the term of this patent is extended or adjusted under 35 U.S.C. 154(b) by 512 days.

(21) Appl. No.: 12/743,785

(22) PCT Filed: Nov. 19, 2008

(86) PCT No.: PCT/US2008/012921
§ 371 (c)(1),
(2), (4) Date: May 19, 2010

(87) PCT Pub. No.: WO2009/067213
PCT Pub. Date: May 28, 2009

(65) Prior Publication Data
US 2010/0270172 A1 Oct. 28, 2010

(30) Foreign Application Priority Data
Nov. 20, 2007 (JP) .................................. 2007-008959

(51) Int. Cl.
*C25B 9/10* (2006.01)
*C02F 1/46* (2006.01)

(52) U.S. Cl.
USPC ........... 204/633; 204/252; 204/630; 204/634; 205/748

(58) Field of Classification Search
USPC ................. 204/252, 253, 263, 627, 628, 630, 204/632, 633; 205/742, 743, 746, 748
See application file for complete search history.

(56) References Cited

U.S. PATENT DOCUMENTS

| 4,137,136 A | 1/1979 | Ueda et al. |
| 7,967,958 B2 * | 6/2011 | Sano .............................. 204/193 |

(Continued)

FOREIGN PATENT DOCUMENTS

| JP | 08229565 A | 9/1996 |
| JP | 1999-319839 | * 11/1999 |

(Continued)

OTHER PUBLICATIONS

KR20050020298_Human_Translation , Translation of KR20050020298.*

(Continued)

*Primary Examiner* — Keith Hendricks
*Assistant Examiner* — Salil Jain
(74) *Attorney, Agent, or Firm* — Andrew D. Sorensen; Shaoni L. Mitchell

(57) ABSTRACT

A three-electrode electrolyzer cell is described that can produce either alkaline water or acid water, by selecting polarity and ion exchange membrane type. The cell has a middle chamber and two side electrolysis chambers bordering the middle chamber. Each of the side electrolysis chambers is separated from the middle chambers by a membrane, which is the same on both sides. Porous electrodes are placed on the electrolysis side of each membrane. The electrolysis chamber electrodes are placed next to the membranes, and they are both charged with either positive or negative polarity at the same time. The electrode in the middle chamber is charged with the opposite polarity to the electrolysis chamber electrodes. Each of the electrolysis chambers has inlets and outlets for flowing a solution to be electrolyzed through the cells. The electrolyte solution is in the middle chamber. It is not circulated, or is only circulated to replenish electrolytes or remove gases. The electrolyzer of the invention is significantly more efficient than prior art electrolyzers, when only one type of water (acid or alkaline) is required.

6 Claims, 1 Drawing Sheet

U.S. PATENT DOCUMENTS

2006/0260954 A1* 11/2006 Sano et al. .................... 205/742
2009/0071843 A1* 3/2009 Miyashita et al. ............ 205/746
2009/0165823 A1* 7/2009 Brown et al. .................. 134/18

FOREIGN PATENT DOCUMENTS

| KR | 20050020298 | * | 3/2005 |
| KR | 1020050020298 A | | 3/2005 |
| KR | 1020050022496 A | | 3/2005 |

OTHER PUBLICATIONS

JP 1999-319839_Suzuki_MT, Machine Translation of JP 1999-319839.*

* cited by examiner

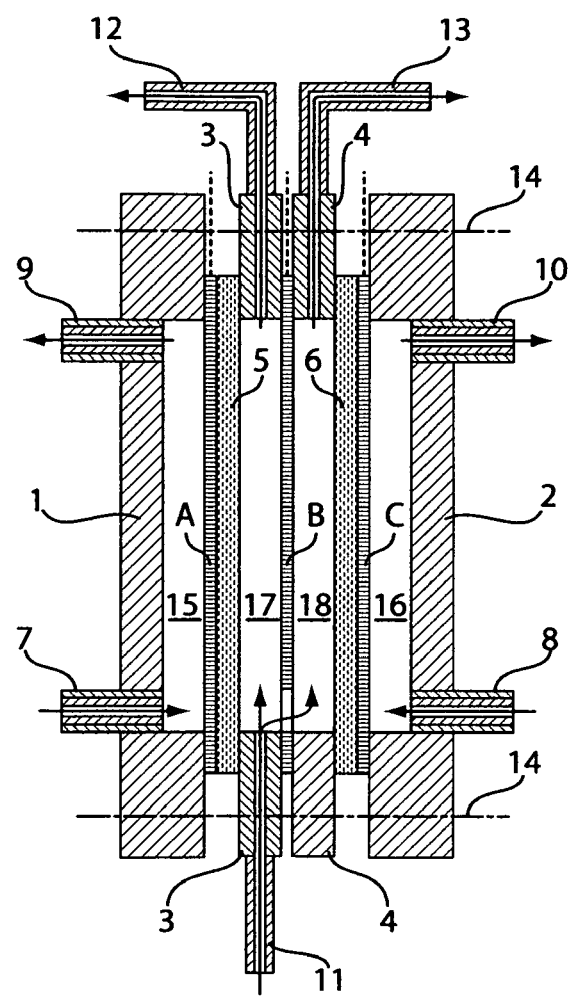

ELECTROLYZER CELL FOR PRODUCING ACIDIC OR ALKALINE ELECTROLYZED WATER

PRIORITY

This application claims priority to Japanese utility model application publication JP3139159 (U), filed Nov. 20, 2007, and assigned to First Ocean KK.

BACKGROUND

1. Technical Field

This invention describes an electrolysis cell which can generate one kind of electrolyzed water continuously, either acidic water or alkaline water, without producing a stream of the other kind of water.

2. Technical Background

In the past, two methods have been used to generate acidic water and alkaline water through electrolysis. One method is the two chamber electrolysis cell wherein water containing a small concentration of electrolyte is fed into a cell divided by a membrane into a positive chamber and a negative chamber. The other method is the three chamber electrolysis cell. The cell is divided by membranes into an electrolysis chamber with a positively charged electrode (anode), a middle chamber, and an electrolysis chamber with a negatively charged electrode (cathode). (See for example Japan Patent Publication #3113645). Usually, flows of both acidic water and alkaline water are generated from these types of cells. However, for a user who needs only one of these types of water, a flowing stream of the unwanted kind of water is generated at the same time, and is wasted as a result.

PROBLEM TO BE SOLVED BY THE INVENTION

The purpose of this invention is to provide an electrolysis cell that produces a stream of alkaline electrolyzed water or a stream of acidic electrolyzed water, but not both. This invention offers an electrolysis cell that does not generate a flowing stream of the unwanted type of electrolyzed water, either acidic or alkaline. In addition, when water is electrolyzed to generate acidic or alkaline water, this invention enhances the production of the desired type of water relative to a conventional 3-chamber electrolyzer of similar size.

SUMMARY OF THE INVENTION

A three chamber electrolysis cell for water has been used in the prior art where there is a middle chamber between two electrolysis chambers, which generate acidic water and alkaline water. There is an electrode in each electrolysis chamber, one positively charged and one negatively charged. Generally, water or dilute electrolyte is flowed through each electrolysis chamber. In this setup, both acidic water and alkaline water are generated.

The present invention also has three chambers, but instead places a third electrode sheet in the middle (or central) chamber, and charges it to the opposite polarity to the electrode sheets in the two outer electrolysis chambers, which are both of the same polarity. By doing this, one may generate either acidic water alone or alkaline water alone in the two electrolysis chambers. Meanwhile, the electrolyte solution in the middle chamber changes its composition through electrochemical reactions on the surface of the electrode, or through the production of reaction gas, but will not generate a flow of the unwanted kind of electrolysis water (either acid or alkaline.) The middle chamber will have provision for ventilation of gas, and may have provisions for circulating limited volumes of electrolyte to replenish the supply contained in the middle chamber. In the case of generating alkaline water, if the composition electrolyzed is selected not to produce chlorine gas, then one may use the same size anode in the middle chamber and the same size membranes as would be used in a conventional cell to generate more of the desired water than could be produced in a conventional cell without damaging electrodes or membranes. It is even possible to increase the total electric current, so as to generate even more alkaline water for a given size of cell and membrane, than in a conventional 3-chamber electrolysis cell.

BRIEF DESCRIPTION OF THE FIGURES

FIG. 1 is a vertical cross section of an electrolysis cell of this invention.

DETAILED DESCRIPTION OF THE INVENTION

An electrolysis cell is presented that can produce acid water or alkaline water separately. FIG. 1 shows a vertical cross section of the electrolysis cell of this invention. FIG. 1 has the following components:

1, 2—the side walls of the electrolysis cell
3, 4—sheets forming the middle chamber
5, 6—the ion exchange membranes
7, 8—the entrances for the solution to be electrolyzed
9, 10—the exits for the solution which is electrolyzed
11—the entrance for the electrolyte solution into the middle chamber
12, 13—the exits for the electrolyte solution
15, 16—the electrolysis chambers
17, 18—the two sections of the middle chamber
A, C—the electrolysis chamber electrode sheets
B—the middle chamber electrode sheet This invention presents an electrolysis cell that can produce acidic water or alkaline water separately. The electrolysis cell consists of two electrolysis chambers with a middle chamber between them. The structure is as follows. The electrolysis cell has sections 17 and 18 of a chamber in the middle. On the outside of these two sections, there are electrolysis chambers 15 and 16. Each electrolysis chamber (15, 16) is separated from the chamber in the middle by membranes (5, 6). Electrodes A and B, having numerous pores or holes, are placed on the electrolysis chamber side of each membrane.

Electrodes A and B are both charged to either positive or negative polarity at the same time. Each of the electrolysis chambers has an inlet 7 or 8 below the cell to guide water in to be electrolyzed. Then, to guide the water out, there are outlets 9 and 10 in the upper section of the chambers.

The electrolyte solution is contained in the middle chamber, which is separated into two sections by the electrode B, having many pores or holes. Below that, there is at least one inlet 11 to guide the electrolyte solution in. In the higher part, on both sides of the electrode sheet, there are two outlets 12 and 13 for the removal of electrolyte solution or gas on each side of the electrode B. The electrode B in the middle chamber is charged to the polarity opposite that of A and C. For the before-mentioned electrolysis cell for water, the following setups may be arranged. The two electrodes which are placed next to each membrane may be charged to positive polarity, and the electrode sheet in the middle chamber can be charged to negative polarity, and, at the same time, each membrane is preferably selected to be a negative ion exchange membrane.

In such a setup, it is also possible to have each membrane be a negative ion exchange membrane, and have the electrodes on the electrolysis side of each membrane, and to have each porous planar electrode separated from the ion exchange membrane by a protective membrane with many slits. (Such a protective membrane is described in U.S. Pat. No. 7,967, 958.)

In a different embodiment, the two electrodes which are placed next to each membrane may be charged to negative polarity, and the electrode sheet which is placed in the middle chamber is charged to positive polarity. In that embodiment, each membrane may be a positive ion exchange membrane. A protective membrane with many slits may be placed in the middle chamber to protect the ion exchange membranes, if required by the chemistry of the reactive species generated. With some chemistries no protective membrane is required.

Preferred Embodiment to Carry Out the Invention

A vertical cross section of this invention is shown in FIG. 1. In FIGS. 1, 1 and 2 are the side walls of the electrolysis cell in rectangular parallelepiped. The walls are made of a material which does not conduct electricity. The electrolysis cell is divided by membranes 5 and 6. The electrolysis chamber 15 is the space between the side wall 1 and the membrane 5. The electrolysis chamber 16 is the space between the side wall 2 and the membrane 6. A is the electrode which is placed next to the membrane 5 on the side of electrolysis chamber 15. C is the electrode which is placed next to the membrane 6 on the side of electrolysis chamber 16. These electrodes A and C are porous or have numerous holes.

The space between the membrane 5 and the membrane 6 is the middle chamber. The middle chamber is between the electrolysis chambers 15 and 16. In the middle chamber, there are sections 17 and 18 created by the electrode sheet B which is placed in the middle of the chamber. This electrode sheet B is porous or has numerous holes. Sheets 3 and 4 are gaskets inserted to create the spaces 17 and 18 in the middle chamber. They form the circumference of the spaces 17 and 18, with the middle area of the sheets 3 and 4 cut out. They are made of electrically non-conductive materials such as plastic.

Each electrolysis chamber has an inlet on the lower part to guide the water in to be electrolyzed. On the upper part, there is an outlet to guide the water out after it is electrolyzed. As illustrated, on the lower part of the electrolysis chamber 15, there is an inlet 7 to guide the water in to be electrolyzed. On the upper part of the electrolysis chamber 15, there is an outlet 9 to guide the water out after it is electrolyzed. As for the electrolysis chamber 16, it has an inlet 8 on the lower part to guide the water in to be electrolyzed. On the upper part of the electrolysis chamber 16, there is an outlet 10 to guide the water out after it is electrolyzed. There may be additional inlets or outlets if required for efficiency in a particular cell.

When the water is guided in to be electrolyzed, the water may first be divided into two portions; one portion may be sent to the inlet 7 to go into the electrolysis chamber 15, and the other portion may be sent to the inlet 8 to go to the chamber 16. When the electrolyzed water leaves outlets 9 and 10, both streams may be collected together as the generated water.

Another method may be to guide the water into inlet 7 to be electrolyzed in the electrolysis chamber 15, then when the electrolyzed water comes out from outlet 9, it may be guided into the inlet 8 to the electrolysis chamber 16 to be electrolyzed there. The finished water may be guided out from the outlet 10 as the generated water.

The electrolyte solution is contained in sections 17 and 18 of the middle chamber. On the lower part, there is at least one inlet to guide the electrolyte solution in. For example, both sections 17 and 18 of the middle chamber may have their own inlet on the lower part. Or, as FIG. 1 shows, only the section 17 of the middle chamber may have the inlet 11 to guide the electrolyte solution in. The electrolyte which is guided in through the inlet 11, may also be guided into section 18 of the middle chamber to fill it. On the upper part of section 17 of the middle chamber, there is the outlet 12 for the electrolyte solution to be guided out. On the upper part of section 18 of the middle chamber, there is the outlet 13 to guide the electrolyte out. The outlets 12 and 13 are also used to let gas out when it is generated at the time of electrolysis. There may be additional inlets or outlets if required for efficiency in a particular cell.

This is how the electrolysis cell is constructed. The membrane 5 and the electrode sheet A are placed next to each other. So are the membrane 6 and the electrode sheet B. However, they may be constructed in layers. The electrode sheets A, B, and C are porous or have numerous holes from face to face. It is preferred to have 1.0 to 3.0 mm caliber holes. The preferred materials for the electrode sheets are titanium coated by plating with platinum or platinum group elements or their oxides. As shown in FIG. 1, the electrolysis cell is constructed by lining up the side wall 1, the electrode sheet A, the membrane 5, the electrode sheet C, the membrane 6, the electrode sheet B, and the side wall 2. To create the middle chamber spaces 17 and 18, the gasket sheets 3 and 4 are inserted properly. The entire assembly is held tightly together by any of a variety of means, including an external frame or a multiplicity of bolts and nuts placed around the perimeter of the housing. For example, in FIG. 1, bolts and nuts, 14 and 14, are used in the upper part and the lower part.

The method for generating either acidic water or alkaline water using the electrolysis cell of this invention is shown here. When acidic electrolyzed water is to be generated, charge the electrode sheets A and C with positive polarity, and the electrode sheet B with negative polarity. Then, apply the direct current. In this case, the sections 17 and 18 of the middle chamber are filled with a solution of salts with chloride ion, for example, sodium chloride, potassium chloride, or hydrochloric acid solutions, to be electrolyzed. In the electrolysis chambers 15 and 16, the acidic water is generated. This acidic water is the electrolysis water with hypochlorous acid as a sanitizing ingredient at an effective chlorine concentration of 10~80 ppm. (Suitable operating conditions for such a cell are known, and some are described or referred to in our co-pending application US 2006/0260954 A1.) In sections 17 and 18 of the middle chamber, sodium hydroxide or potassium hydroxide and hydrogen gas are generated. The generated gas is discharged from nozzles on outlets 12 and 13. The electrolyte solution to be contained in sections 17 and 18 of the middle chamber may be circulated between the middle chamber and a separate cell on the outside with the help of gravity or a pump. Such circulation may be used to remove gas from the cell, or to maintain the concentration of electrolytes in the middle cell.

Under the above-mentioned conditions, chlorine gas is generated on the surface of the positive electrode sheets A and C. By the action of that chlorine gas, the neighboring membrane (negative ion exchange membrane) deteriorates, which causes unsteady production. To solve this problem, protective membranes with multiple slits are used. When the electrode sheets A and B are placed on the electrolysis chamber side of each membrane, these protective membranes with slits are placed between each membrane and electrode sheet (not illustrated). By doing this, the chlorine gas can escape through the multiple slits before it is confined around each membrane. Therefore, the amount of chlorine gas directly touching the membrane is reduced, which prevents the membrane from being attacked.

Materials for the protective membrane are selected from asbestos, glass wool, poly vinyl chloride fibers, poly vinylidene fibers, polyester fibers, aromatic polyamide fibers, or their nonwoven cloth. Sometimes, paper and cellophane are used. The most desirable material is a nonwoven cloth with good ion permeability. The desirable width between slits, which are oriented vertically on the protective membranes, is 1 to 10 mm. The most desirable width is 3 to 7 mm. These protective membranes with slits are easy to produce. However, there is a possibility of a negative nature where the chlorine gas may touch the ion exchange membrane because the uneven pressure may work on the membrane, or the pressure opens the slits slightly to let the chlorine gas escape toward the ion exchange membrane.

Another example of a protective membrane is the use of rectangular pieces of nonwoven cloth. To achieve this effect, onto the edge of the first piece of nonwoven cloth, the second piece of nonwoven cloth is placed slightly overlapping. Onto the edge of the second piece of nonwoven cloth, the third piece of nonwoven cloth is placed slightly overlapping. Keep repeating this to cover the area. Then, at the end, use adhesive to put the pieces together at the periphery. The overlapped areas work as slits. How much to overlap depends on the size of the membrane. Generally speaking, 1 to 5 mm of overlap is preferable. This type of protective membrane is suitable to protect a larger area. Even if the membrane is distorted by the uneven pressure, or the membrane expands for some reason, the overlapped areas still work as slits.

When an alkaline water such as potassium hydroxide or sodium hydroxide is the desired electrolyzed water, the electrodes A and C are charged to negative polarity. The electrode B is charged to positive polarity. Then, the direct current is applied. In this case, the electrolyte solution in the middle chambers 17 and 18 is, for example, sodium carbonate solution, or potassium carbonate solution, or sodium hydrogen carbonate (sodium bicarbonate) solution, or potassium hydrogen carbonate (potassium bicarbonate) solution. Similar materials, or combinations of the materials named and/or similar materials, may also be used. In particular, the middle chamber contains a solution comprising monovalent cations, and preferably contains a potentially volatile anion such as carbonate or bicarbonate anions. In a preferred embodiment, the carbonate or bicarbonate anions in the middle chamber are more than 90% of the anions in the middle chamber (by number.)

In the electrolysis chambers 15 and 16, a flowing alkaline water is generated, having a main component of potassium and/or sodium hydroxide, which has a lower redox potential and high pH. Such a solution is useful for many purposes, and in particular for cleaning and disinfecting. In sections 17 and 18 of the middle chamber, carbon dioxide and oxygen gas are generated, but the unwanted acidic water is not generated. The generated gas is discharged through nozzles 12 and 13. The electrolyte solution to be contained in sections 17 and 18 of the middle chamber may be circulated between the middle chamber and a separate cell on the outside with the help of a pump. (Sodium or potassium carbonate or bicarbonate is consumed in the reaction and may be replaced.) With these chemicals, no protective membrane is needed. However, a protective membrane may be placed between the electrode in the middle chamber and the membranes on each side of the middle chamber, if required by the chemistry of the solutions in use.

Example 1

FIG. 1 shows the electrolysis cell of this invention. In this example, an acidic water is generated through electrolysis in the electrolysis cell. A resin membrane with negative ion exchange ability is used for the membranes 5 and 6 to separate each electrolysis chamber from the middle chamber. The electrode sheets A and C are sheets which, in this example, have a usable overall area of 55 $cm^2$, and are provided with numerous holes (caliber of 2 mm) The material for the sheets is titanium with platinum/iridium fired on. The electrode sheet B has a usable area of 55 $cm^2$ with numerous holes (caliber of 2 mm). The material for the sheet is titanium with platinum plated on. Between the electrode sheet A and the membrane 5, and also between the membrane 6 and the electrode sheet C, the protective membrane is placed in close contact. For this, protective film MF250B manufactured by Yuasa Membrane System is used. Numerous vertical slits of 5 mm in separation are added to this membrane.

As the electrolyte solution in the middle chamber, a sodium chloride solution of about 30% in concentration is used. To each of the electrode sheets A and C, a direct current of 6.5 amperes at 7 volts is applied. To the electrode sheet B, a direct current of 13 amperes at 7 volts is applied. The original solution to be supplied to the electrolysis cell is directed into two flows. One flow is supplied to the electrolysis chambers 15 and 16 as the solution to be electrolyzed. The other flow is the solution not to be electrolyzed, which is mixed with the electrolyzed solution which comes out of the electrolysis chambers 15 and 16. That is the acidic water intended to be generated. The amount of solution to be electrolyzed in the chambers 15 and 16 is set at 200 cc/minute, and the amount of solution not to be electrolyzed is set at 2000 cc/minute, then, after electrolysis, the solutions are mixed, so that the generated amount of the acid electrolyzed water is 2200 cc/minute. The pH value is 3.2, and the effective chlorine concentration is 35 ppm. Such a solution is useful for many purposes, and in particular for cleaning and disinfecting. In this case, the pH of the electrolyte solution in the middle chambers at the start is pH=10.0. It begins to climb until it reaches 13. However, the goal of not generating a continuous flow of alkaline water is reached.

Example 2

FIG. 1 shows an electrolysis cell of this invention. In this example, alkaline water is generated through electrolysis in the electrolysis cells. A resin membrane with positive ion exchange is used for the membranes 5 and 6 to separate each electrolysis chamber from the middle chamber. The electrode sheets A and C are placed in close contact with the membranes 5 and 6. The electrode sheets A and C and also the electrode sheet B have a usable area of 55 $cm^2$ with numerous holes (caliber of 2 mm). They are made of a titanium sheet with platinum plated on. In the middle chamber, the electrolyte solution of potassium carbonate at approximately 50% concentration by weight is contained.

The original solution to be supplied to the electrolysis cell is directed into two flows. One half of the solution is supplied to the electrolysis chamber 15, and the other half is supplied to the electrolysis chamber 16. By combining the solutions coming out of the chamber 15 and the chamber 16, the alkali water is successfully gained. The direct current applied to the electrode sheets is 20 amperes at 9 volts. The combined amount of solution supplied to the electrolysis chambers is measured. The amount is varied, from 200 cc/minute through 1000 cc/minute, to measure the pH and the oxidation-reduction potential (ORP). The result is shown in Table 1 (below).

TABLE 1

| Cc/min to electrolysis chambers | pH | ORP |
|---|---|---|
| 200 | 12.57 | −818 |
| 300 | 12.33 | −690 |
| 400 | 12.25 | −600 |
| 600 | 12.12 | −614 |
| 800 | 12.01 | −550 |
| 1000 | 11.91 | −520 |

As Table 1 shows, an alkaline water with higher pH and with lower oxidation-reduction potential is generated when a smaller flow rate of solution is supplied to the electrolysis chambers. As the flow rate of solution increases, it generates alkaline water with lower pH. At the same time, oxidation-reduction potential rises. In this example, when the amount of solution supplied to the electrolysis chambers is between 200 cc and 800 cc/minute, the most desirable alkaline water is obtained, having a pH greater than pH 12, and with less than −500 mV oxidation-reduction potential. Such a solution is useful for many purposes, and in particular for cleaning and disinfecting.

It should be noted, from the data in Table I, that the pH and ORP are correlated, as is the level of ions (including cations here, and free chlorine in an acid water producing cell), and may be varied by operating conditions or by post-electrolysis dilution to obtain solutions optimized for a particular use.

Comparison with Prior Art Electrolysis Cells

In comparison with the invention, a conventional three chamber electrolysis cell is described. In the conventional case, there are two electrolysis chambers, one on each side of the middle chamber. (There is one positive electrode sheet and one negative electrode sheet, one in each electrolysis chamber, and none in the middle chamber.) In this example, the effective area of the electrode sheets is made the same (55 $cm^2$) as in Example 2. In this case, the electrode sheets are supplied with a direct current of 6.5 ampere at 6 volt to hydrolyze the solution. When the amount of solution supplied to the negative chamber is 80 cc/minute, 120 cc/minute, and 200 cc/minute, the generated alkaline water's pH is 12.39, 12.29, and 12.14 respectively. The ORP is −725 volt, −750 volt, and −600 volt respectively.

Thus, the conventional cell and the cell of this invention are compared to prove that the conventional cell does not generate an alkaline water of the same level of pH and of oxidation-reduction potential as does the new cell as shown in Example 2, even though both cells are of similar size and membrane area. To generate the alkaline water of the same level of pH and the same ORP as shown in Example 2 using the conventional cell, the flow rate of solution supply needs to be reduced to 30-40% of what was used in the cell of this invention. In other words, comparing the data from Table 1 with the date from the prior art experiment, it appears that the rate of production of an alkaline water of a given pH and ORP in the improved cell of the invention, compared to a prior art cell of the same membrane area, is at least about 2 times as great, and probably 2.5 to 3 times as great. Thus, the system of the invention produces significant increases in the efficiency of production of electrolyzed water.

Unless defined otherwise, all technical and scientific terms used herein have the same meanings as commonly understood by one of skill in the art to which the disclosed invention belongs. Although any methods and materials similar or equivalent to those described herein can be used in the practice or testing of the present invention, the preferred methods, devices, and materials are as described. Publications cited herein and the material for which they are cited are specifically incorporated by reference, where such incorporation is permitted. Nothing herein is to be construed as an admission that the invention is not entitled to antedate such disclosure by virtue of prior invention, where relevant. Those skilled in the art will recognize, or be able to ascertain using no more than routine experimentation, many equivalents to the specific embodiments of the invention described herein. Such equivalents are intended to be encompassed by the following claims.

The invention claimed is:

1. A method of producing a flow of either acidic or alkaline electrolyzed water, wherein the production of a second flow of a complementary alkaline or acidic electrolyzed water is inhibited, the method comprising:
    (a) providing a three chamber electrolysis cell with at least two electrolysis chambers and a middle chamber, wherein each of the two electrolysis chambers contain an electrode separated from the middle chamber by an ion exchange membrane and the middle chamber contains an electrode which is bound in part by the ion exchange membranes wherein the ion exchange membranes are selected to exchange either anions or cations;
    (b) applying a voltage between the electrode in the middle chamber and the electrodes in the two electrolysis chambers wherein the electrodes in the two electrolysis chambers are electronically charged with either positive or negative polarity, and the electrode in the middle chamber is charged with an opposite polarity wherein the ion exchange membranes have negative ion exchange ability when the electrodes have positive polarity and wherein the ion exchange membranes have positive ion exchange ability when the electrodes have negative polarity; and
wherein the middle chamber contains a solution comprising at least one of carbonate and bicarbonate anions wherein the carbonate and bicarbonate anions in the middle chamber are more than 90% of the anions in the middle chamber;
    (c) circulating a solution to be electrolyzed through the electrolysis chambers thereby generating electrolyzed water in the electrolysis chambers, wherein polarity of the electrodes and correlated exchange characteristics of the membranes cause the electrolyzed water to be acidic or alkaline.

2. The method of claim 1 wherein the membranes are anion exchange membranes and the electrodes in the two electrolysis chambers have a positive polarity and the electrode in the middle chamber has a negative polarity.

3. The method of claim 2 further comprising the step of adding non-electrolyzed water to the electrolyzed water from the electrolysis cells, wherein a selected value of pH, free chlorine or oxidation-reduction potential in the final acid electrolyzed water is obtained.

4. The method of claim 2 wherein the middle chamber contains a solution comprising halide anions.

5. The method of claim 1 wherein the membranes are cation exchange membranes and the electrodes in the two electrolysis chambers have a negative polarity and the electrode in the middle chamber has a positive polarity.

6. The method of claim 5 wherein the middle chamber contains a solution comprising monovalent cations.

* * * * *